United States Patent
Daikuhara et al.

(10) Patent No.: US 7,297,028 B2
(45) Date of Patent: Nov. 20, 2007

(54) CABLE CONNECTOR TYPE TRANSCEIVER MODULE

(75) Inventors: Osamu Daikuhara, Shinagawa (JP); Koichi Kiryu, Shimotakai-gun (JP); Toshihiro Kusagaya, Shinagawa (JP); Tohru Yamakami, Shinagawa (JP); Shigeyuki Takizawa, Shinagawa (JP); Yasuyuki Miki, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 11/489,482

(22) Filed: Jul. 20, 2006

(65) Prior Publication Data

US 2007/0140643 A1   Jun. 21, 2007

(30) Foreign Application Priority Data

Dec. 1, 2005   (JP) ............................. 2005-348171

(51) Int. Cl.
*H01R 9/03* (2006.01)
(52) U.S. Cl. ..................... 439/610; 439/638; 439/76.1; 439/577
(58) Field of Classification Search ............... 439/610, 439/76.1, 638, 577
See application file for complete search history.

(56) References Cited

U.S. PATENT DOCUMENTS

| | | | | |
|---|---|---|---|---|
| 5,797,771 A | * | 8/1998 | Garside | 439/610 |
| 6,210,229 B1 | * | 4/2001 | Lai | 439/610 |
| 6,336,827 B1 | * | 1/2002 | Akama et al. | 439/610 |
| 6,386,919 B2 | * | 5/2002 | Medina et al. | 439/610 |
| 6,781,391 B2 | * | 8/2004 | Reed et al. | 324/754 |
| 2006/0121794 A1 | * | 6/2006 | Hanley et al. | 439/677 |

FOREIGN PATENT DOCUMENTS

JP   2000-068007   3/2000

* cited by examiner

*Primary Examiner*—Tho D. Ta
(74) *Attorney, Agent, or Firm*—Staas & Halsey LLP

(57) ABSTRACT

A cable connector type transceiver module is disclosed. Pads for wire soldering are disposed near a card edge connecting section of the tip of a printed circuit board on the printed circuit board. Pairs of wires of a cable for balanced transmission are extended in the direction of the card edge connecting section over a control IC package. Signal wires at the tips of insulation covered signal wires of the pairs of wires are soldered to the pads for wire soldering at the position near the card edge connecting section rather than near the control IC package.

9 Claims, 16 Drawing Sheets

FIG.11
(a)
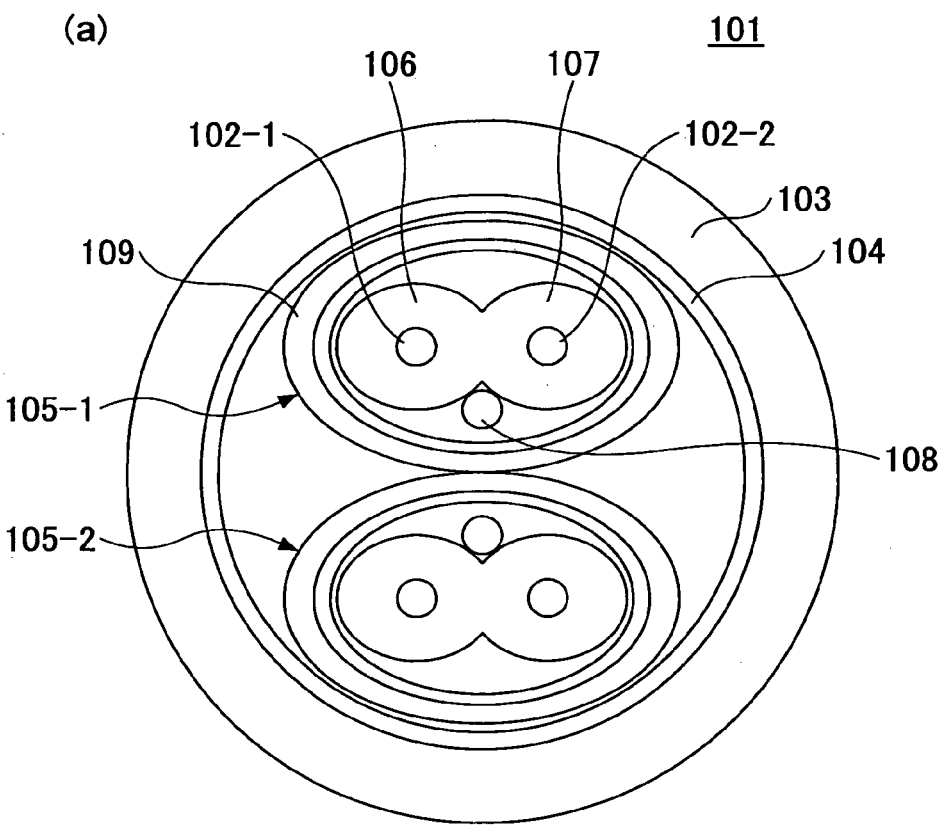
(b)
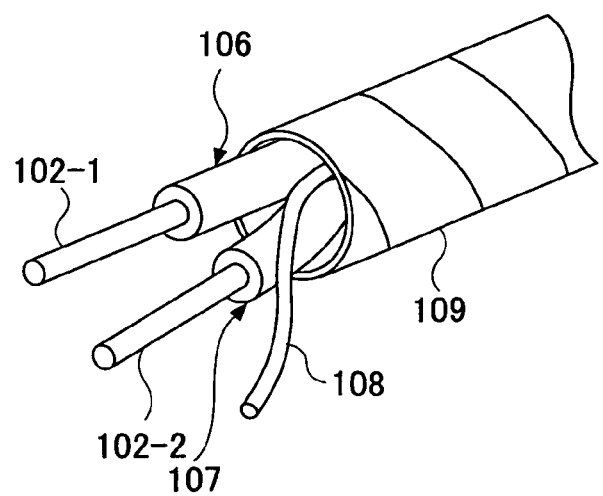

CABLE CONNECTOR TYPE TRANSCEIVER MODULE

BACKGROUND OF THE INVENTION

1. Field of the Invention

The present invention generally relates to a cable connector type transceiver module having module connectors from whose backside a cable for balanced transmission is extended and is used to connect a HDD (hard disk drive) to a switching device in a RAID (redundant array of independent disks).

2. Description of the Related Art

FIG. 1 is a block diagram showing a RAID. As shown in FIG. 1, plural HDDs 20 and a switching device 30 are disposed in a RAID 10, and each HDD 20 is electrically connected to the switching device 30 so that data can be transmitted and received between the HDD 20 and the switching device 30. Plural RAIDs 10 are disposed and each RAID 10 is connected to a server 40 via a network by Ethernet (registered trademark).

FIG. 2 is a diagram showing a connection between the HDD 20 and the switching device 30. Since the distance between the HDD 20 and the switching device 30 is as small as one to two meters, conventionally, as shown in FIG. 2, the connection between them is performed by electric transceiver modules 50 and 60 and a cable connector 70 which uses a copper wire cable 71, instead of by an optical fiber.

The electric transceiver module 50 has a thin and long rectangular parallelepiped shape and provides a control IC package 51, a card edge section 52 at one end, a connector 53 at the other end, and has a function to receive/transmit data. Similarly, the electric transceiver module 60 has a thin and long rectangular parallelepiped shape and provides a control IC package 61, a card edge section 62 at one end, a connector 63 at the other end, and has a function to receive/transmit data.

The cable connector 70 provides the copper wire cable 71 and connectors 72 and 73 one at each end.

The electric transceiver module 50 is inserted into a slot 21 of the HDD 20 and the card edge section 52 is connected to a card edge connector 22 of the HDD 20.

The electric transceiver module 60 is inserted into a slot 31 of the switching device 30 and the card edge section 62 is connected to a card edge connector 32 of the switching device 30.

The connector 72 is connected to the connector 53 and the connector 73 is connected to the connector 63.

The transmission rate of data between the HDD 20 and the switching device 30 is approximately 2 Gbps.

[Patent Document 1] Japanese Laid-Open Patent Application No. 2000-68007

In a next generation RAID, the transmission rate of data between the HDD 20 and the switching device 30 becomes, for example, 4 Gbps or more. That is, the transmission rate becomes high speed. When data are transmitted at high speed, losses of signals in a transmission line become large.

In the transmission line between the HDD 20 and the switching device 30, the losses occur at the connection point between the connector 72 and the connector 53, the connection point between the connector 73 and the connector 63, and entire long wiring patterns on printed circuit boards in the electric transceiver modules 50 and 60.

Consequently, in the above connection between the HDD 20 and the switching device 30, the losses of signals become large at the transmission rate of 4 Gbps, and the transmission rate of 4 Gbps cannot be efficiently utilized.

SUMMARY OF THE INVENTION

Accordingly, the present invention may provide a cable connector type transceiver module which can be used at high speed.

According to the present invention, there is provided a cable connector type transceiver module. The cable connector type transceiver module includes transceiver module connectors disposed one at each end of a cable for balanced transmission which cable provides pairs of wires in which a pair of insulation covered signal wires is bundled, and the transceiver module connector has a transceiver module main body assembled in a housing. The transceiver module main body includes a printed circuit board which provides a card edge connecting section at the tip, plural pads for wire soldering near the card edge connecting section, and wiring patterns extending between the card edge connecting section and the pads for wire soldering, and a control IC package mounted on the printed circuit board. The pairs of wires of the cable for balanced transmission are extended in the card edge connecting section direction over the control IC package, and signal wires which the tips of the insulation covered signal wires are uncovered are soldered to the pads for wire soldering.

According to embodiments of the present invention, the pairs of wires at the end of the cable for balanced transmission are extended in the direction of the card edge connecting section over the control IC package and the signal wires extended from the tips of the insulation covered signal wires are soldered to the pads for wire soldering at the position near the card edge connecting section rather than near the control IC package. Therefore, on the printed circuit board, the length of the wiring patterns between the card edge connecting section and the pads for wire soldering can be made short. Consequently, the cable connector type transceiver module can be used at the high speed of the data transmission rate.

Features and advantages of the present invention will be apparent from the following detailed description when read in conjunction with the accompanying drawings.

BRIEF DESCRIPTION OF THE DRAWINGS

FIG. 11 is a diagram showing the cable for balanced transmission shown in FIG. 9;

DESCRIPTION OF THE PREFERRED EMBODIMENTS

Figure 1:
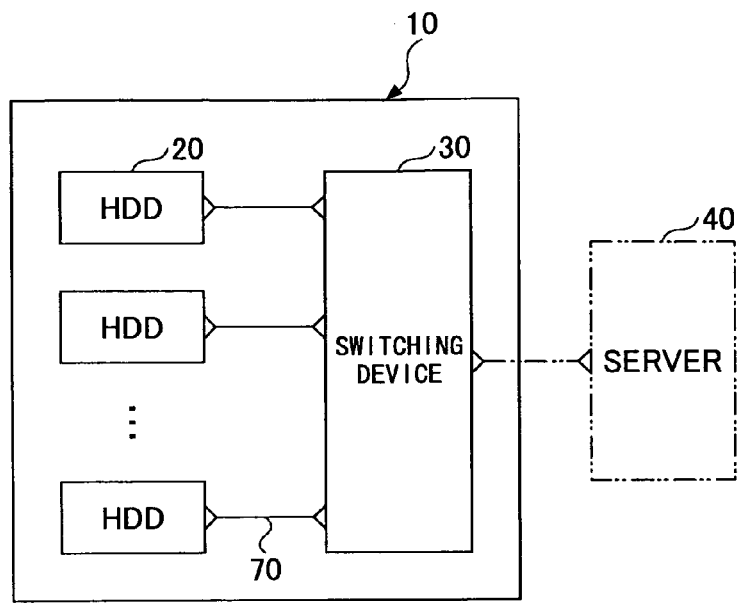
FIG. 1 is a block diagram showing a RAID which uses cable connectors.

Referring to the drawings, embodiments of the present invention are explained.

First Embodiment

Figure 2:
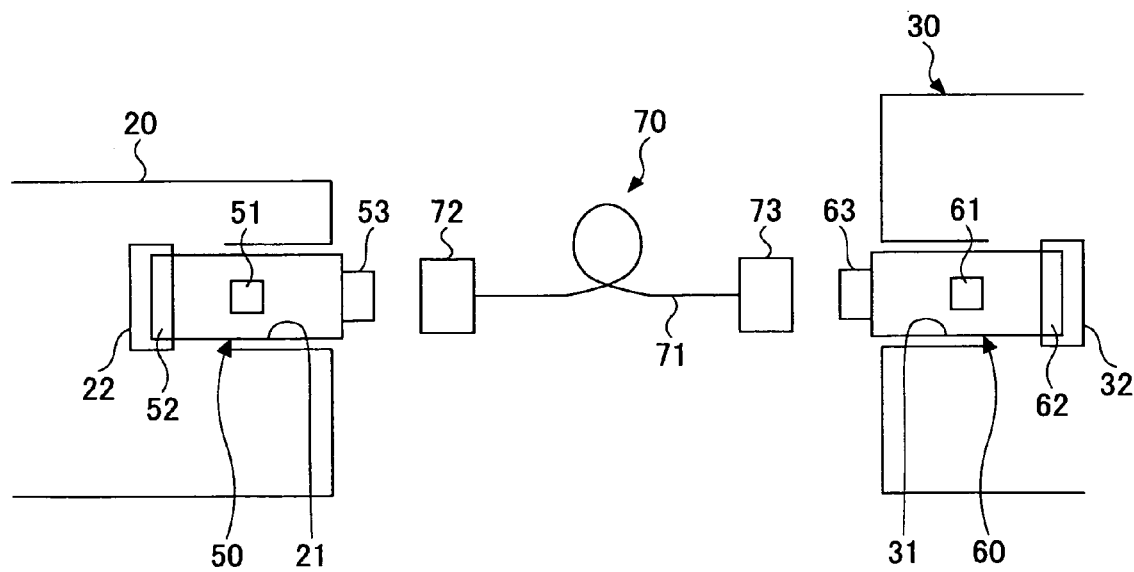
FIG. 2 is a diagram showing a connection between a HDD and a switching device by using the cable connector shown in FIG. 1.
Figure 3:
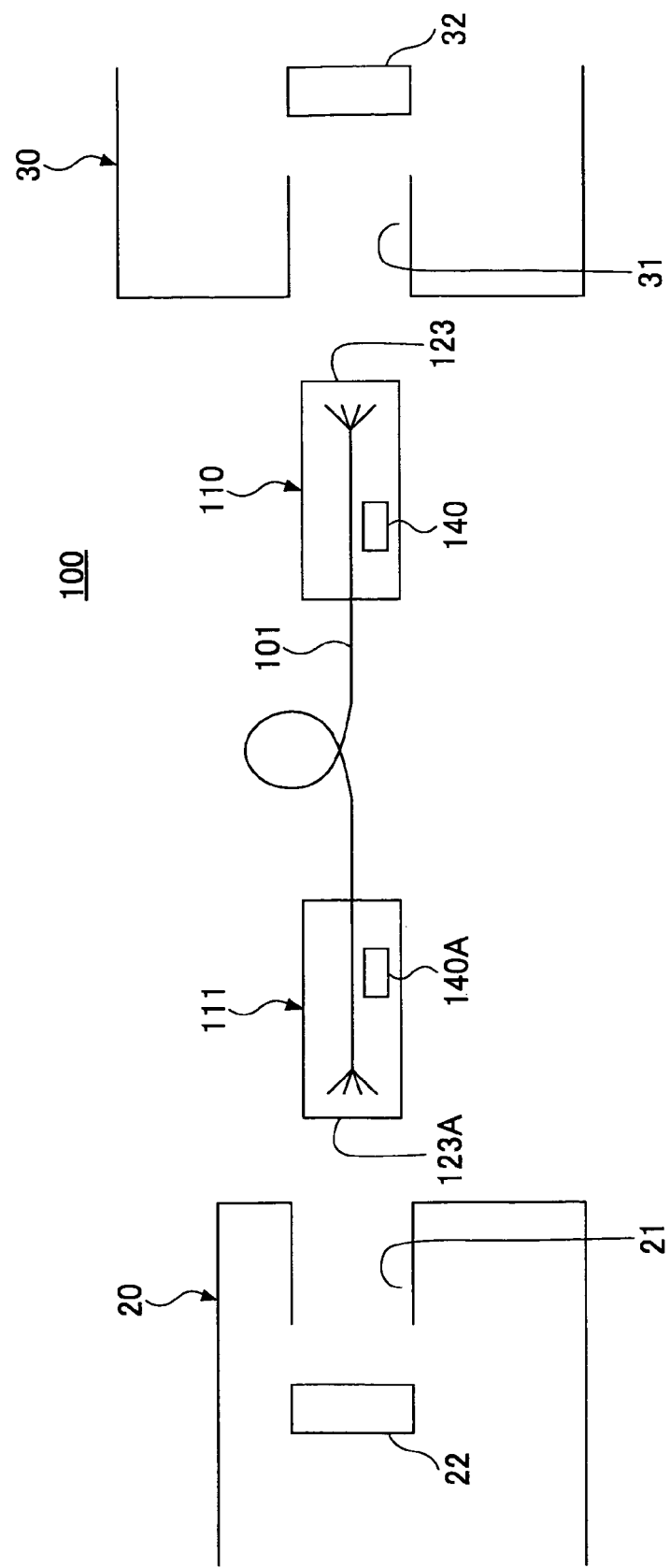
FIG. 3 is a schematic diagram showing a cable connector type transceiver module according to a first embodiment of the present invention.

FIG. 3 is a schematic diagram showing a cable connector type transceiver module 100 according to a first embodiment of the present invention. In FIG. 3, the HDD 20 and the switching device 30 which are the same as those in FIG. 2 are shown. As shown in FIG. 3, the cable connector type transceiver module 100 has electric transceiver module connectors 110 and 111 (in some case, hereinafter referred to as module connectors) connected one to each end of a cable for balanced transmission 101. When the cable connector type transceiver module 100 is used, the module connector 110 is connected to the card edge connector 32 of the switching device 30 by being inserted into the slot 31 of the switching device 30, and the module connector 111 is connected to the card edge connector 22 of the HDD 20 by being inserted into the slot 21 of the HDD 20. The structure of the module connector 110 is the same as that of the module connector 111. Therefore, the structure of the module connector 110 is described.

Figure 4:
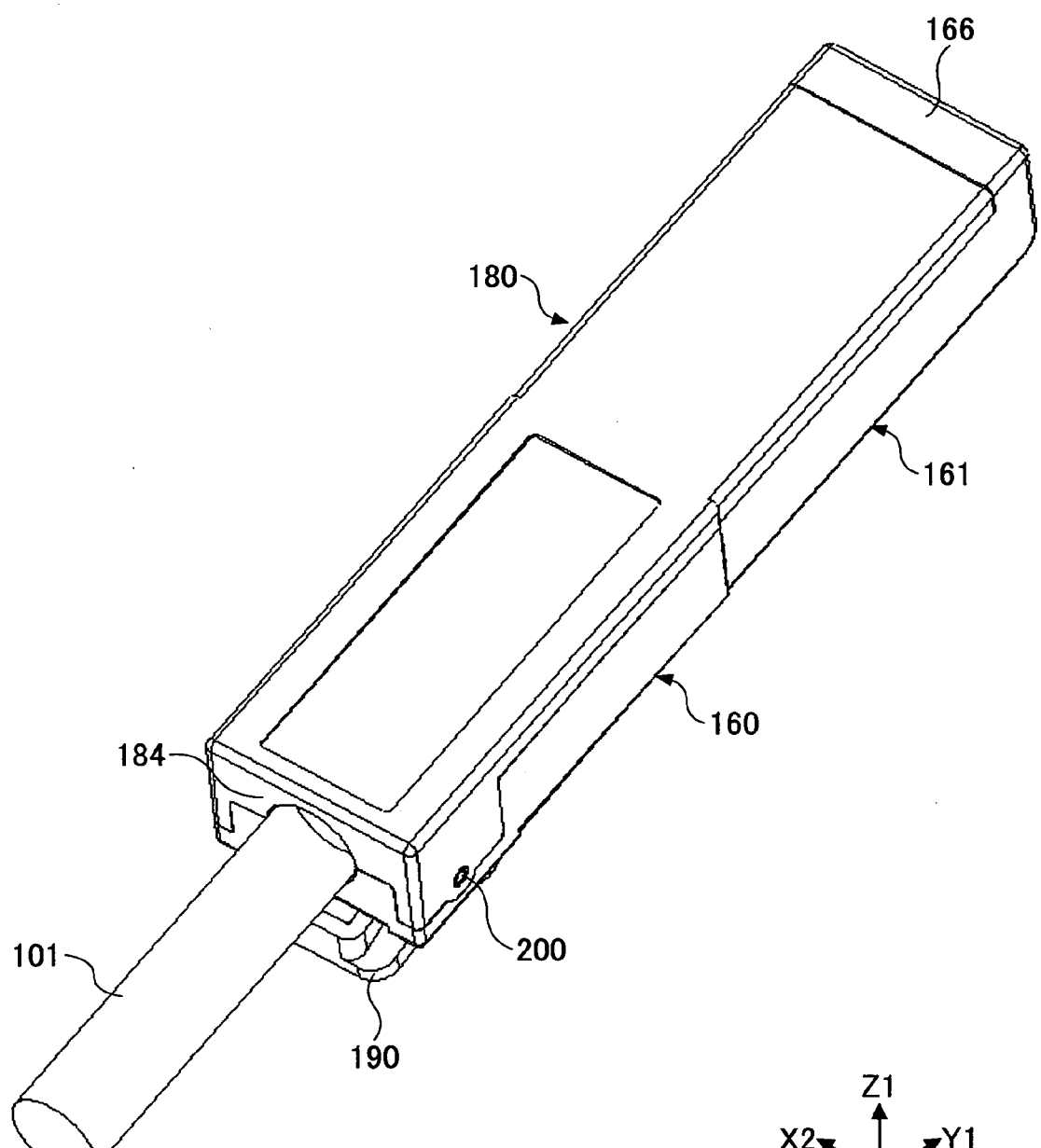
FIG. 4 is a perspective view of an electric transceiver module connector shown in FIG. 3.
Figure 5:
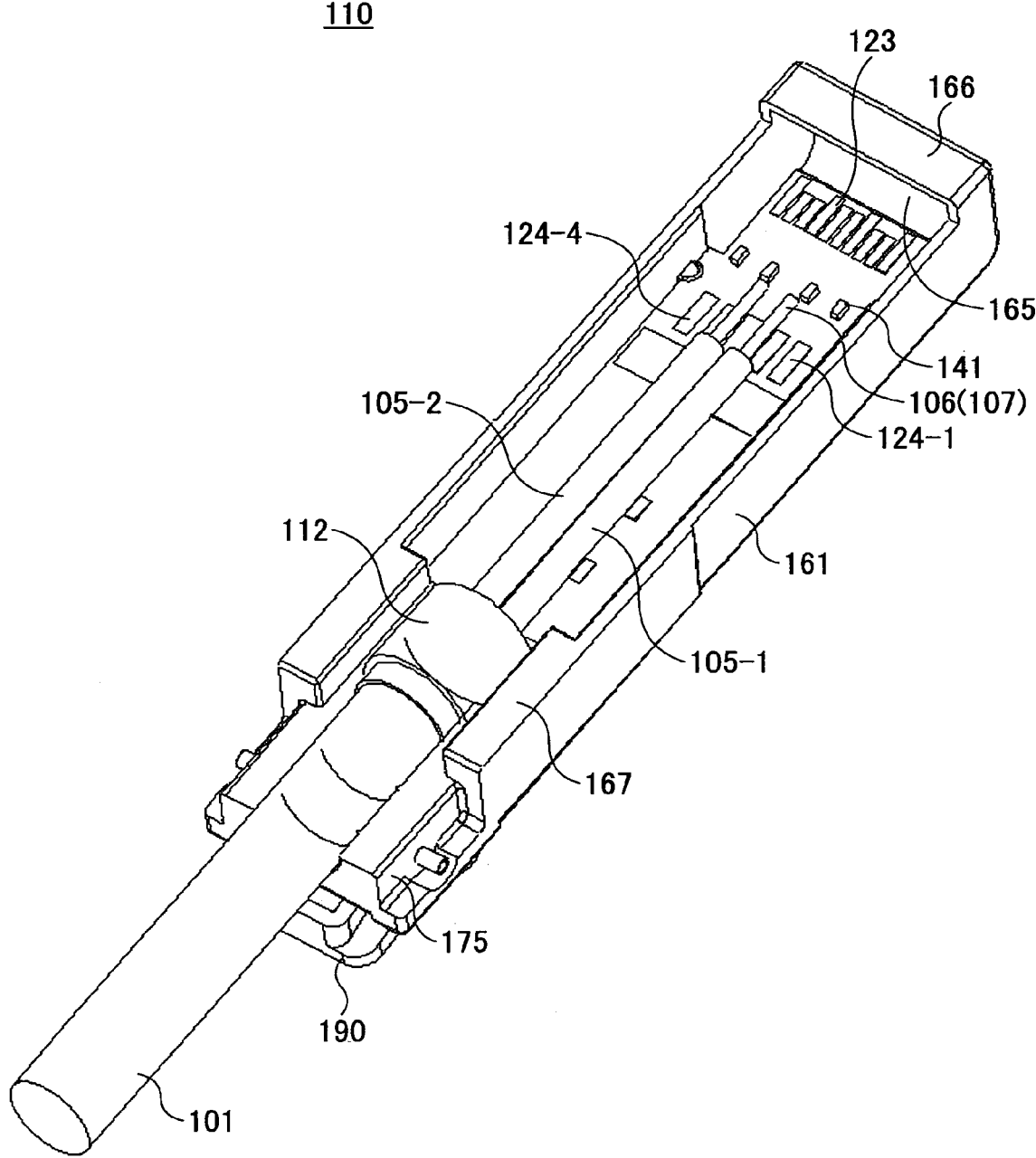
FIG. 5 is a perspective view of the inside of the electric transceiver module connector shown in FIG. 4 in which an upper cover is removed.
Figure 6:
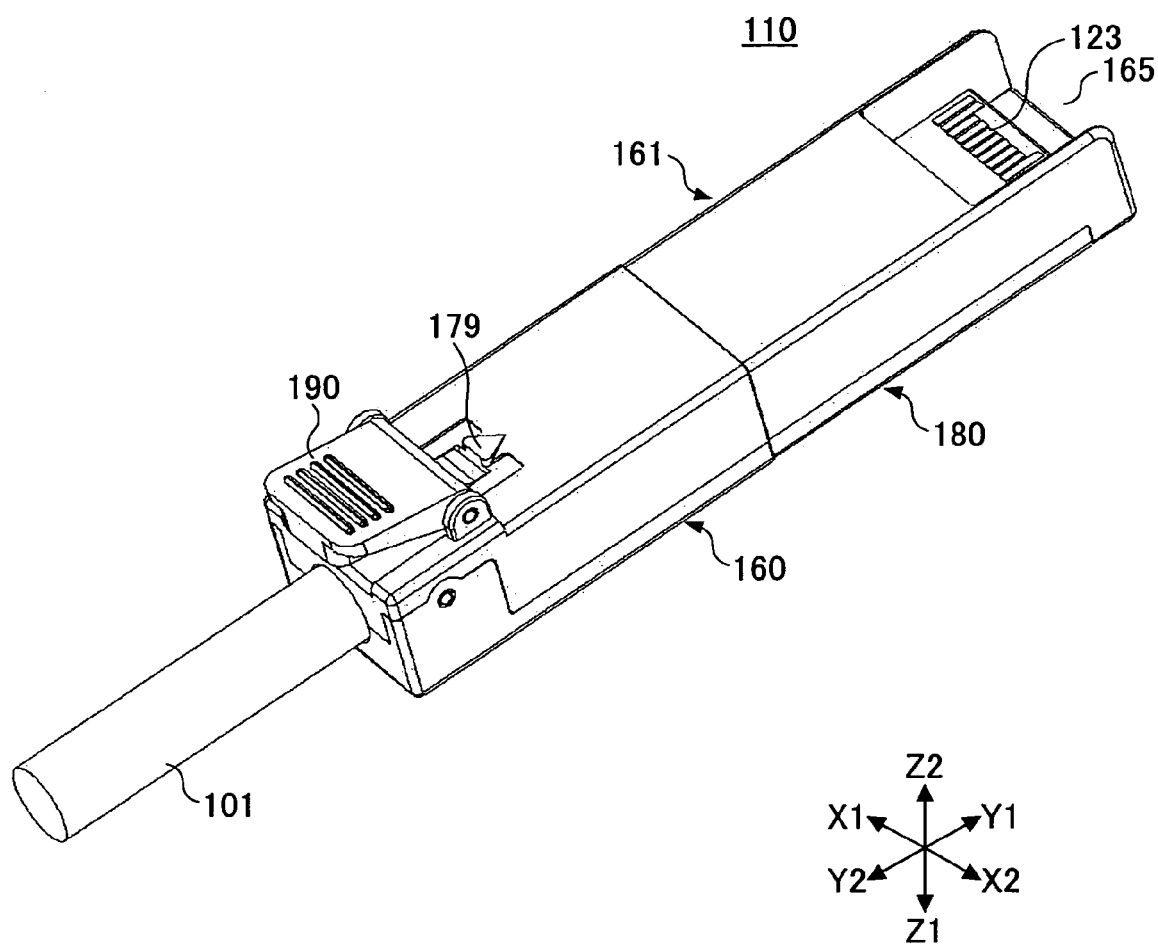
FIG. 6 is a perspective view of the electric transceiver module connector shown in FIG. 4 which is viewed from the back.
Figure 7:
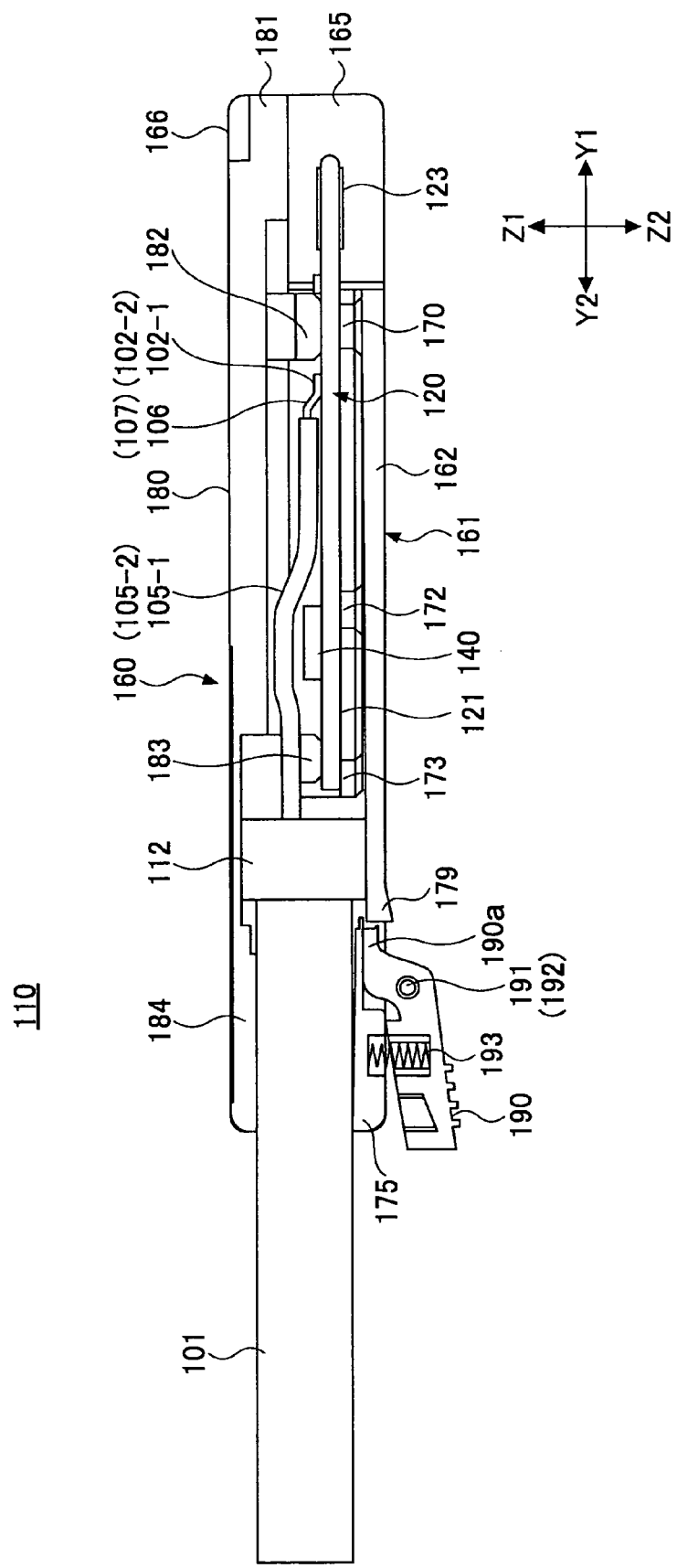
FIG. 7 is a side cut-away view of the electric transceiver module connector shown in FIG. 4.
Figure 8:
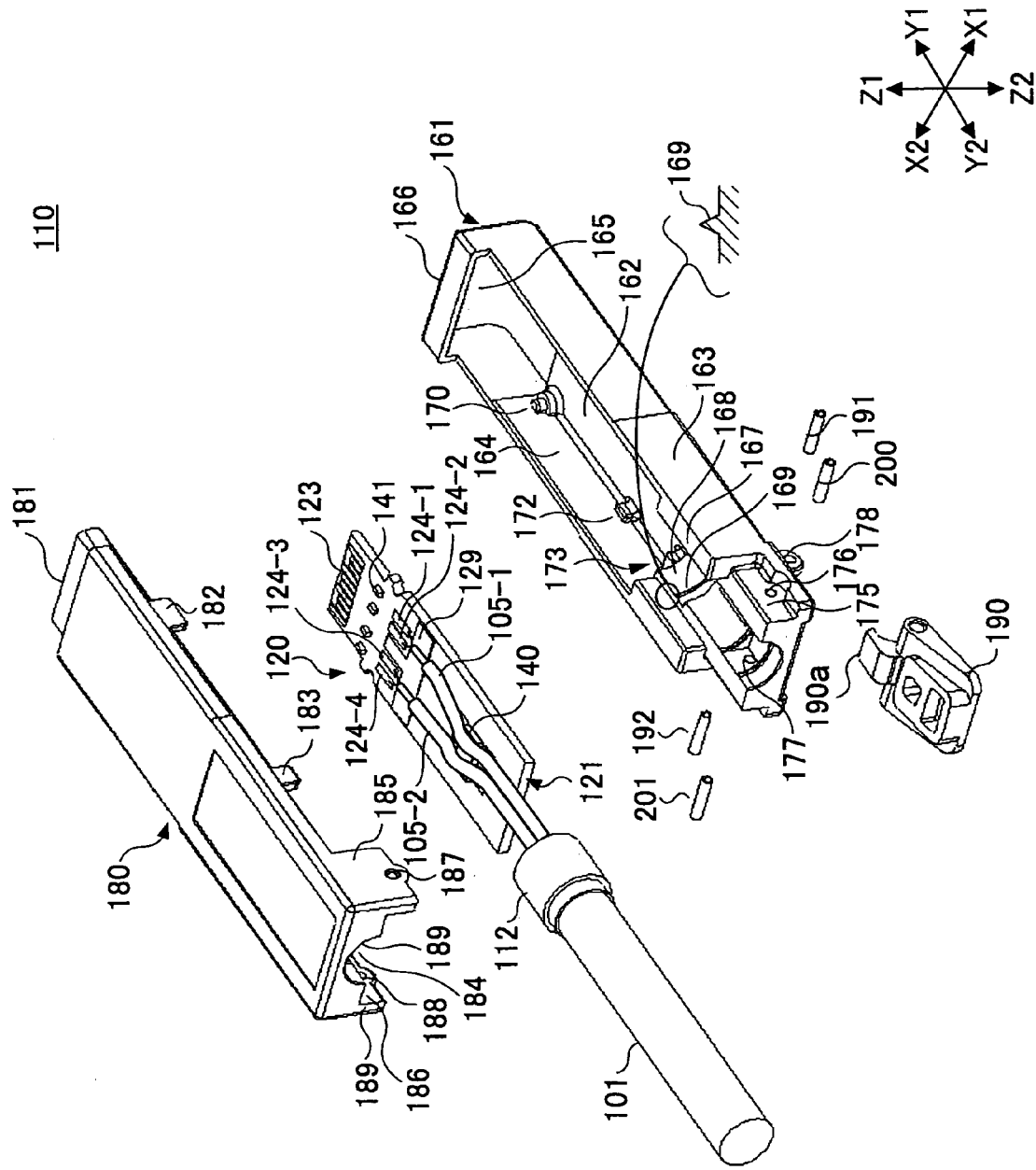
FIG. 8 is an exploded perspective view of the electric transceiver module connector shown in FIG. 4.

FIG. 4 is a perspective view of the electric transceiver module connector 110 shown in FIG. 3. FIG. 5 is a perspective view of the inside of the electric transceiver module connector 110 shown in FIG. 4 in which an upper cover is removed. FIG. 6 is a perspective view of the electric transceiver module connector 110 shown in FIG. 4 which is viewed from the back. FIG. 7 is a side cut-away view of the electric transceiver module connector 110 shown in FIG. 4. FIG. 8 is an exploded perspective view of the electric transceiver module connector 110 shown in FIG. 4.

In the drawings, the direction X1-X2 is the width direction of the module connector 110, the direction Y1-Y2 is the length direction of the module connector 110 (the module connector 110 inserting and pulling out direction), and the direction Z1-Z2 is the height direction of the module connector 110. In addition, the direction Y1 is the module connector inserting direction into the switching device 30, and the direction Y2 is the cable for balanced transmission extending direction.

Referring to FIGS. 4 through 8, the module connector 110 is described. In the module connector 110, a transceiver module main body 120 to which one end of the cable for balanced transmission 101 is connected is contained in a housing 160, and the cable for balanced transmission 101 is extended from the Y2 side of the housing 160.

[Housing 160]

As shown in FIG. 4, the housing 160 has a rectangular parallelepiped shape which is long in the Y1-Y2 direction and has a size to accommodate the slot 31. The housing 160 includes a housing main body 161 and an upper cover 180 which are formed by zinc die cast.

As shown in FIG. 8, the housing main body 161 has an approximate box shape providing a bottom plate section 162 and side plate sections 163 and 164 at corresponding sides. The Z1 side top of the housing main body 161 is an opening. In the housing main body 161, an opening 165 is formed in the Y1 end, a bridge section 166 spanning between the side plate sections 163 and 164 is formed at the Z1 side of the Y1 end, and a cable clamping section 167 for clamping the cable for balanced transmission 101 is formed at the Z1 side of the Y2 end. The cable clamping section 167 has a concavity section 168 whose cross section is a half circle and a rib 169 for cutting into the cable for balanced transmission 101 is formed in the middle of the concavity section 168. The rib 169 whose cross section is a triangle protrudes in the concavity section 168 so that the rib 169 is formed in the X1-X2 direction along the concavity section 168. On the bottom plate section 162, a protrusion with step 170, and step sections 172 and 173 for positioning the transceiver module main body 120 are formed at the side of the side plate section 164. At the side of the side plate section 163 on the bottom plate section 162, similarly, a protrusion with step, and step sections for positioning the transceiver module main body 120 are formed.

In addition, at the Y2 end of the housing main body 161, a flange engaging section 175 which a flange of the upper cover 180 engages is formed. Holes 176 and 177 for spring pins are formed in the flange engaging section 175. At the Z2 side of the Y2 end of the housing main body 161, a pair of flanges 178 is formed to attach a unlocking lever, and a protrusion for locking 179 (FIGS. 6 and 7) is formed.

As shown in FIGS. 6 and 7, an unlocking lever 190 is attached to the Y2 end of the housing main body 161 by spring pins 191 and 192 which are pressed from both sides through the holes of the flange 178. The unlocking lever 190 is rotated in the counter-clockwise direction around the spring pins 191 and 192 as the center with a claw 190a of the unlocking lever 190 contacting the lower surface of the housing main body 161.

As shown in FIG. 8, the upper cover 180 has an approximate plate shape, an inserting section 181 is formed at the Y1 end, lugs 182 and 183 are formed in the middle of the X1 side, and a cable clamping section 184 and flanges 185 and 186 are formed at the Y2 end. The cable clamping section 184 has the same structure as that of the cable clamping section 167 and provides a concavity section 189. The flanges 185 and 186 provide holes 187 and 188 for spring pins.

[Transceiver Module Main Body 120]

Figure 9:
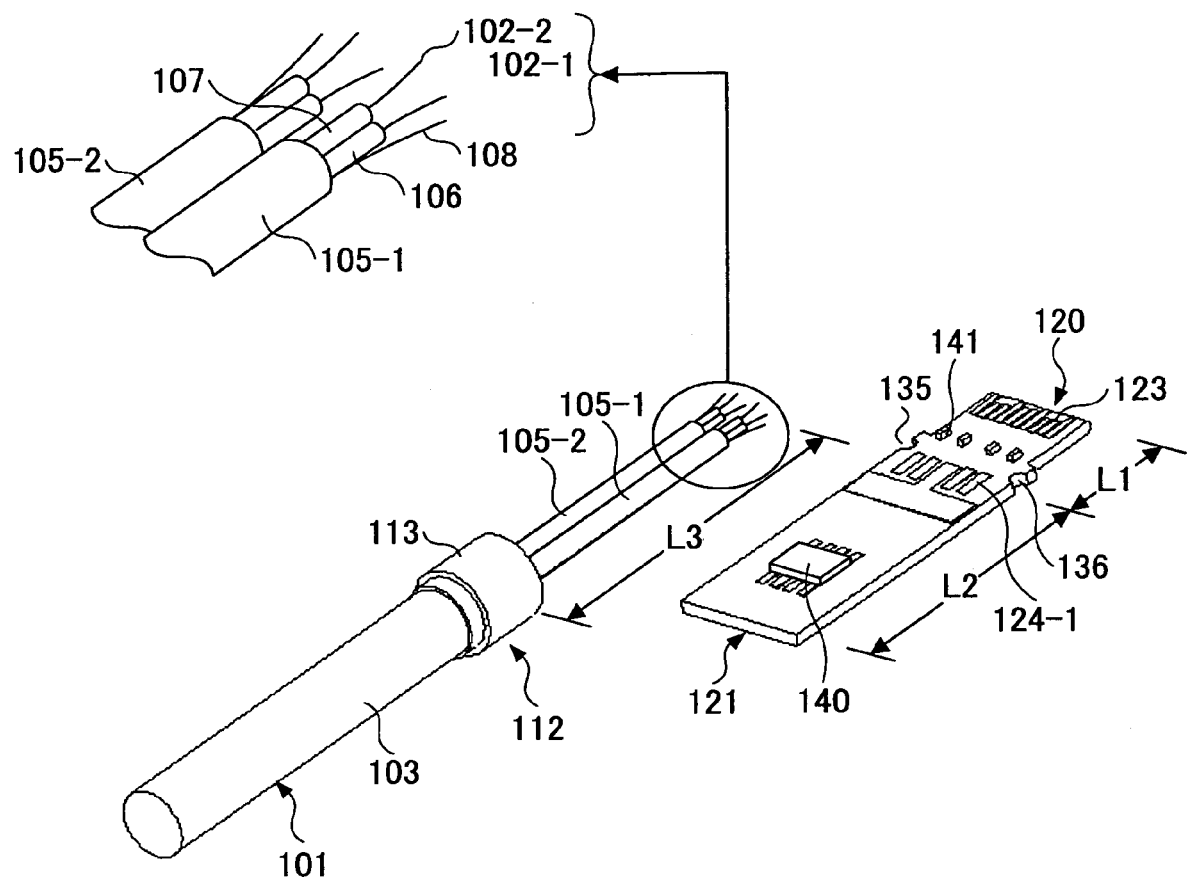
FIG. 9 is a perspective view of a transceiver module main body and a cable for balanced transmission shown in FIG. 7.
Figure 10:
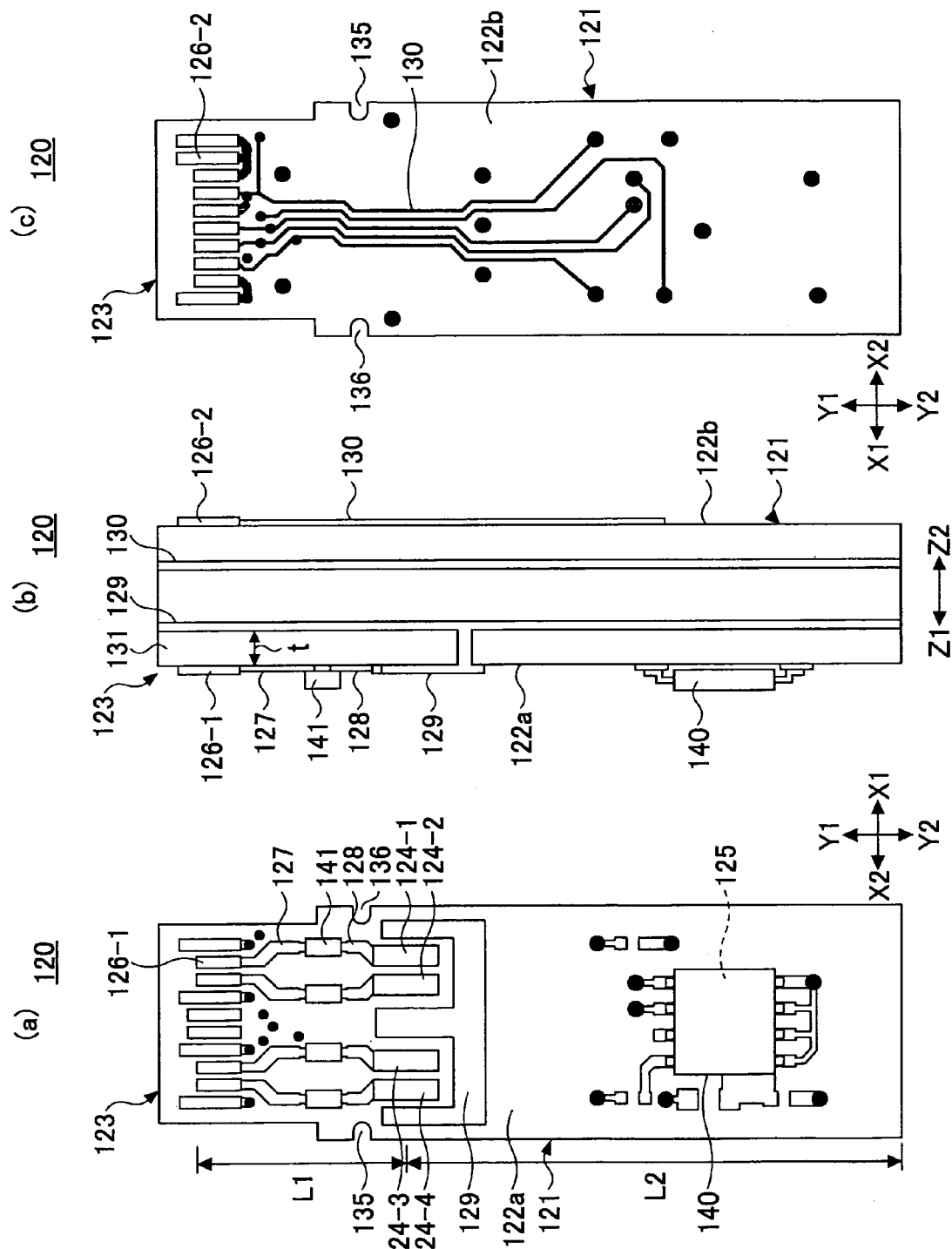
FIG. 10 is a diagram showing the transceiver module main body shown in FIG. 9.

FIG. 9 is a perspective view of the transceiver module main body 120 and the cable for balanced transmission 101. FIG. 10 is a diagram showing the transceiver module main body 120. In FIG. 10, (a) shows a pattern at the side of an upper surface 122a of a printed circuit board 121, (b) shows a cut-away side view of the printed circuit board 121 in which the thickness direction is enlarged, and (c) shows a pattern at the side of a lower surface 122b of the printed circuit board 121.

In the transceiver module main body 120, a control IC package 140 and AC coupling capacitors 141 are mounted on the upper surface 122a of the printed circuit board 121. The control IC package 140 includes a microcomputer circuit, a memory circuit, and so on, and information such as the type of the transceiver module main body 120 is stored in the memory circuit. This information is transmitted to the switching device 30 when the cable connector type transceiver module 100 is used.

The printed circuit board 121 provides a card edge connecting section 123 at the Y1 end, pads for wire soldering 124-1 through 124-4 near the card edge connecting section 123, and a control IC package mounting section 125 at the Y2 end. The pads for wire soldering 124-1 through 124-4 are positioned at the side of the card edge connecting section 123 rather than at the position near the control IC package mounting section 125. The pads for wire soldering 124-1 through 124-4 are arrayed in the X1-X2 direction parallel to the card edge connecting section 123. The distance L1 between the card edge connecting section 123 and the pads for wire soldering 124-1 through 124-4 is as small as approximately 5 mm. L2 is the distance between the pads for wire soldering 124-1 through 124-4 and the edge of the Y2 end of the printed circuit board 121.

The card edge connecting section 123 includes plural terminal patterns 126-1 on the upper surface 122a and plural terminal patterns 126-2 on the lower surface 122b. The surfaces of the plural terminal patterns 126-1 and 126-2 are formed by Au plating.

As shown in FIG. 10(a), wiring patterns 127 are extended in the Y2 direction from the plural terminal patterns 126-1, and wiring patterns 128 are extended in the Y1 direction from the pads for wire soldering 124-1 through 124-4. The corresponding AC coupling capacitors 141 are mounted between the ends of the wiring patterns 127 and the ends of the wiring patterns 128.

As shown in FIG. 10(b), the printed circuit board 121 includes a ground pattern 129 and a signal/power supply pattern 130 as inner layers. The thickness "t" of an insulation layer 131 is suitably determined, and the widths of the wiring patterns 127 and 128 are also suitably determined. In addition, the interval between the adjacent wiring patterns 127 and the interval between the adjacent wiring patterns 128 are suitably determined. The impedance value from the terminal patterns 126-1 to the pads for wire soldering 124-1 through 124-4 via the wiring patterns 127 and 128 is matched to be, for example, 100 Ω.

As shown in FIG. 10(a), a ground pattern 129 having an E shape is formed near the pads for wire soldering 124-1 through 124-4.

As shown in FIG. 10(c), the signal/power supply pattern 130 is extended in the Y2 direction from the plural terminal patterns 126-2 to the control IC package mounting section 125 on the lower surface 122b.

Notches 135 and 136 are formed at corresponding sides of the printed circuit board 121 near the pads for wire soldering 124-1 through 124-4 for positioning the printed circuit board 121.

[Cable for Balanced Transmission 101]

FIG. 11 is a diagram showing the cable for balanced transmission 101. In FIG. 11, (a) shows a side cut-away view of the cable for balanced transmission 101, and (b) shows a perspective view of a pair of wires in the cable for balanced transmission 101. As shown in FIG. 11(a), the cable for balanced transmission 101 has a structure in which two pairs of wires 105-1 and 105-2 are contained in a double cover tube composed of an outer cover 103 and a shield mesh wire 104. As shown in FIG. 11(b), the pair of wires 105-1 (105-2) has a pair of insulation covered signal wires 106 and 107 and a drain wire 108 for balanced signal transmission that are shielded by being spirally bundled in a metal tape 109. The metal tape 109 contacts the shield mesh wire 104. From the end of the pair of wires 105-1, the insulation covered signal wires 106 and 107 and the drain wire 108 are extended in the outside direction. Signal wires 102-1 and 102-2 are exposed by removing the insulation cover from the tips of the insulation covered signal wires 106 and 107.

As shown in FIG. 9, the distance L3 that the pairs of wires 105-1 and 105-2 are extended from the outer cover 103 is slightly greater than the distance L2 (the distance between the pads for wire soldering 124-1 through 124-4 and the edge of the Y2 end of the printed circuit board 121).

In addition, as shown in FIG. 9, the outer cover 103 provides a terminal arranging section 112 at the end. The terminal arranging section 112 puts the shield mesh wire 104 (FIG. 11) on the surface of the outer cover 103 (FIG. 11) by folding back and this part is clinched by wrapping a metal tape 113.

[Connection of Cable for Balanced Transmission 101 to Transceiver Module Main Body 120]

As shown in FIG. 8, the tip of the cable for balanced transmission 101 is connected to the transceiver module main body 120.

As shown in FIGS. 8 through 11, in the pair of wires 105-1, the signal wire 102-1 is soldered to the pad for wire soldering 124-1, the signal wire 102-2 is soldered to the pad for wire soldering 124-2, and the drain wire 108 is soldered to the ground pattern 129. Similarly, in the pair of wires 105-2, the signal wire 102-1 is soldered to the pad for wire soldering 124-3, the signal wire 102-2 is soldered to the pad for wire soldering 124-4, and the drain wire 108 is soldered to the ground pattern 129. The ends of the signal wires 102-1 and 102-2 soldered to the pads for wire soldering 124-1 through 124-4 are arrayed in the X1-X2 direction parallel to the card edge connecting section 123 at the position near the card edge connecting section 123.

As shown in FIGS. 7 and 8, the pairs of wires 105-1 and 105-2 are positioned over the control IC package 140.

[Electric Transceiver Module Connector 110]

Figure 12:
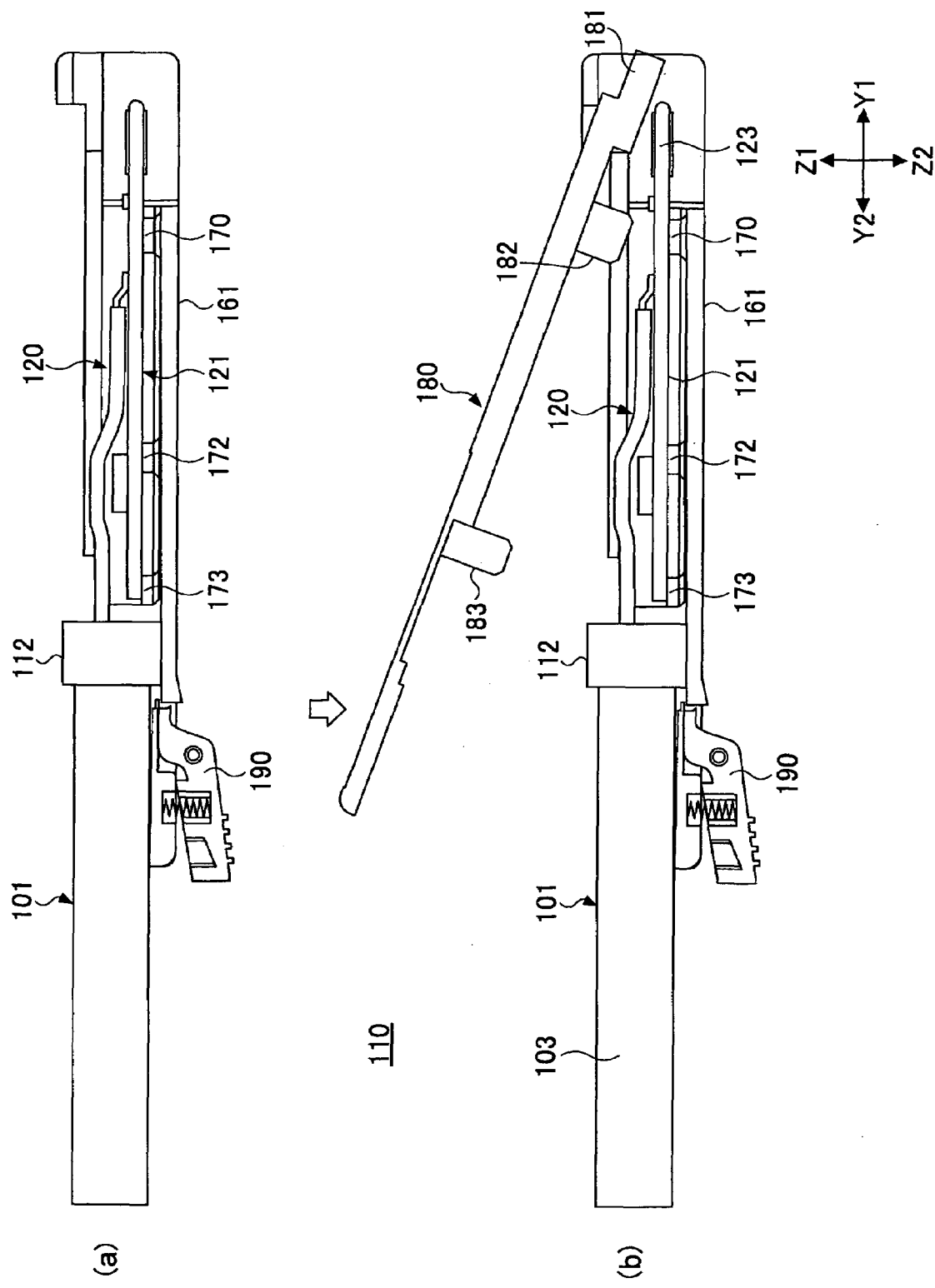
FIG. 12 is a diagram showing assembling processes of the electric transceiver module connector shown in FIG. 4.

FIG. 12 is a diagram showing assembling processes of the electric transceiver module connector 110. First, in a process shown in FIG. 12(a), the transceiver module main body 120 attached to the tip of the cable for balanced transmission 101 is put in the housing main body 161, and the end of the cable for balanced transmission 101 is contained in the cable clamping section 167 (FIG. 8) of the housing main body 161. Next, in a process shown in FIG. 12(b), the inserting section 181 of the upper cover 180 is engaged under the bridge section 166 by causing the Y1 side of the upper cover 180 to face in the slanting downward direction. Further, the Y2 side of the upper cover 180 is rotated in the Z2 direction by setting the engaged point as the supporting point, and the upper cover 180 covers the opening of the housing main body 161. Then, the flanges 185 and 186 (FIG. 8) of the upper cover 180 are engaged in the flange 175 (FIG. 8) of the housing main body 161, and the upper cover 180 is strongly pushed in the Z2 direction. Finally, a spring pin 200 (FIG. 8) is strongly pushed into the holes 187 and 176 (FIG.

8) from the X1 side, and a spring pin 201 (FIG. 8) is strongly pushed into the holes 188 and 177 (FIG. 8) from the X2 side. With this, the electric transceiver module connector 110 is assembled.

In this, since the inserting section 181 is engaged under the bridge section 166, the Y1 side of the upper cover 180 is prevented from moving in the Z1 direction. Therefore, it is not needed to secure the Y1 side of the upper cover 180 and it is enough to secure the Y2 side of the upper cover 180 by pushing strongly. Consequently, the assembling processes can be easy.

By pushing the Y2 side of the upper cover 180 to the Z2 direction, a part of the upper cover 180 and a part of the housing main body 161 strongly push the terminal arranging section 112 of the cable for balanced transmission 101.

The printed circuit board 121 of the transceiver module main body 120 is positioned in the Y1-Y2 direction by engaging the notches 135 and 136 (FIG. 10) in the-protrusions with step 170. In addition, as shown in FIG. 7, the printed circuit board 121 is positioned in the Z1-Z2 direction by being supported by the protrusions with step 170 and the step sections 172 and 173, and by being pushed by the lugs 182 and 183. In addition, the printed circuit board 121 is positioned in the X1-X2 direction by the side plate sections 163 and 164 (FIG. 8). Therefore, the card edge connecting section 123 is positioned at the approximate center part of the opening 165.

The end of the cable for balanced transmission 101 is clamped by being sandwiched between the cable clamping sections 167 and 184 (FIG. 8). The terminal arranging section 112 is pushed by being sandwiched between the housing main body 161 and the upper cover 180. The rib 103 cuts into the outer cover 103 (FIG. 8).

The electric transceiver module connector 111 has the same structure as that of the electric transceiver module connector 110, and the sign A is added to the reference number of each element in the electric transceiver module connector 111.

[Cable Connector Type Transceiver Module 100]

As shown in FIG. 3, in the cable connector type transceiver module 100, the card edge connecting section 123 is connected to the card edge connector 32 by inserting the electric transceiver module connector 110 into the slot 31 of the switching device 30, and the electric transceiver module connector 110 is locked by latching the protrusion for locking 179 (FIG. 7) in an opening for locking (not shown) of the slot 31. Further, the card edge connecting section 123A is connected to the card edge connector 22 by inserting the electric transceiver module connector 111 into the slot 21 of the HDD 20, and the electric transceiver module connector 111 is locked by latching the protrusion for locking 179A in an opening for locking (not shown) of the slot 21. With this, a data transmission line between the HDD 20 and the switching device 30 is established. Then information of the type of the transceiver module main body 120A stored in the control IC package 140A in the electric transceiver module connector 111 is sent to the switching device 30, and also information of the type of the transceiver module main body 120 stored in the control IC package 140 in the electric transceiver module connector 110 is sent to the HDD 20. By the above information, the switching device 30 and the HDD 20 recognize the type of the connected cable connector type transceiver module 100; therefore, data transmission can be suitably performed.

The data transmission is performed by a balanced transmission system. In the balanced transmission system, a plus signal and a minus signal whose size is the same as that of the plus signal and direction is opposite are transmitted at the same time by using two pairs of wires.

Data from the HDD 20 to the switching device 30 are transmitted by, for example, the pair of wires 105-1 and data from the switching device 30 to the HDD 20 are transmitted by the pair of wires 105-2.

Figure 13:
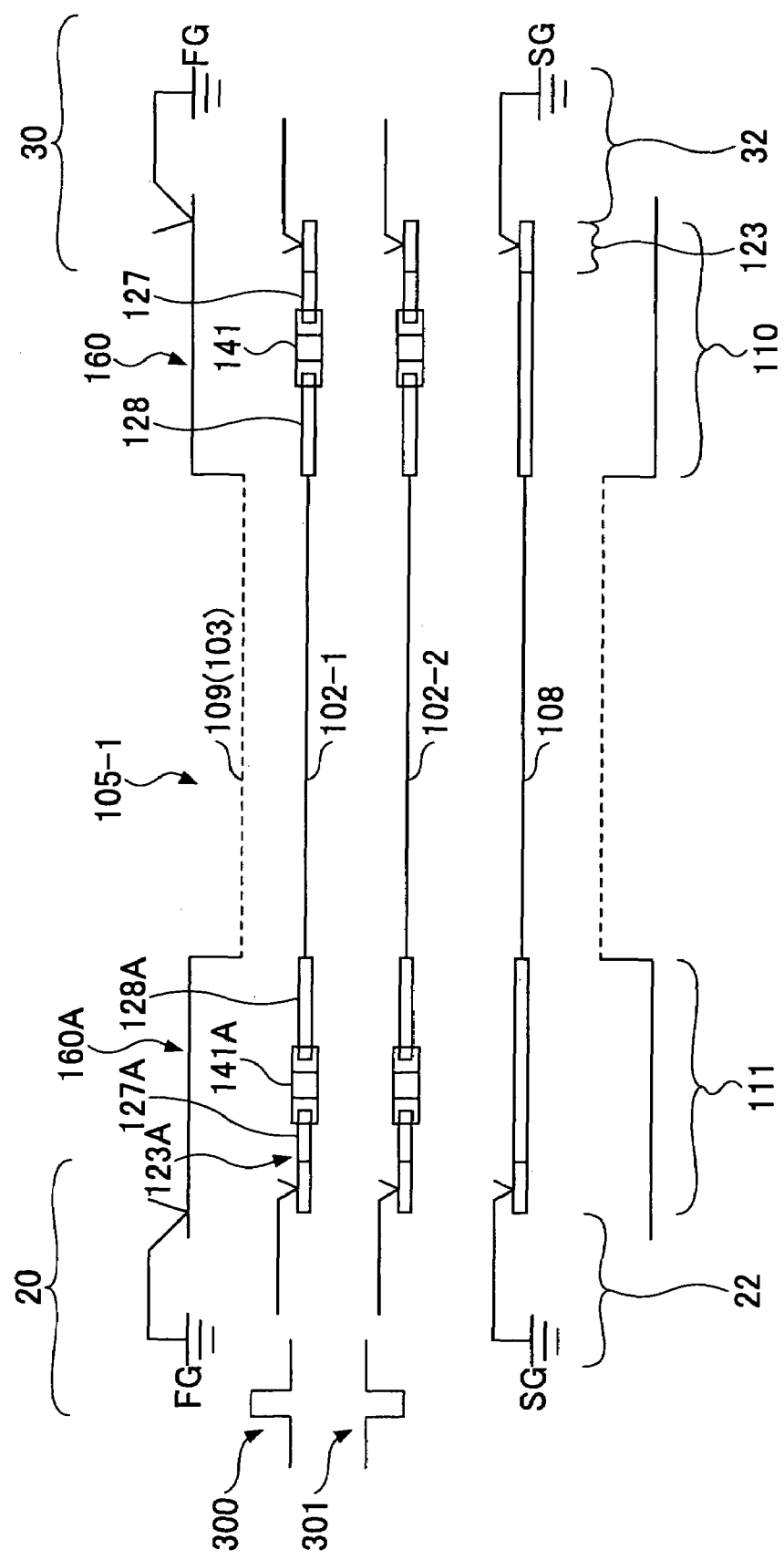
FIG. 13 is a diagram showing a transmission line by using a pair of wires of the cable for balanced transmission shown in FIG. 11.

FIG. 13 is a diagram showing a transmission line by using the pair of wires 105-1.

One end of the metal tape 109 is electrically connected to a frame ground FG of the HDD 20 via the housing 160A and the other end of the metal tape 109 is electrically connected to a frame ground FG of the switching device 30 via the housing 160.

One end of the drain wire 108 is electrically connected to a signal ground SG of the HDD 20 via the card edge connector 22 and the other end of the drain wire 108 is electrically connected to a signal ground SG of the switching device 30 via the card edge connector 32.

A plus signal 300 from the HDD 20 is transmitted to the switching device 30 via the card edge connector 22, the card edge connecting section 123A, the wiring pattern 127A, the AC coupling capacitor 141A, the wiring pattern 128A, the signal wire 102-1, the wiring pattern 128, the AC coupling capacitor 141, the wiring pattern 127, the card edge connecting section 123, and the card edge connector 32. A minus signal 301 from the HDD 20 is transmitted to the switching device 30 via a similar route to the above by using the signal wire 102-2 instead of using the signal wire 102-1.

In the above transmission line, the connectors 72 and 73 in the cable connector 70 shown in FIG. 2 do not exist. Therefore, in the present embodiment, losses generated at the connection points at the connectors 72 and 73 can be reduced.

When signal transmission characteristics of wiring patterns formed on a printed circuit board are compared with signal transmission characteristics of signal wires in the pair of wires 105-1, the signal transmission characteristics of the signal wires in the pair of wires 105-1 are more excellent. Therefore, in the cable connector type transceiver module 100, the lengths of the wiring patterns 127, 128, 127A, and 128A are as short as possible.

Therefore, by using the cable connector type transceiver module 100, the following advantages can be obtained. That is, first, the number of the connector connecting points is small; second, the length of the wiring patterns 127, 128, 127A, and 128A is as short as possible; third, a balanced transmission system is used for data transmission; and finally, the impedance of the signal route of the wiring patterns 127, 128, 127A, and 128A is matched to be 100 Ω. With this, high-speed data transmission of 4 Gbps between the HDD 20 and the switching device 30 can be realized. In addition, since the length of the wiring patterns 127, 128, 127A, and 128A is short, the length of the cable for balanced transmission 101 can be long. Therefore, the transmission distance where the high-speed data are normally transmitted can be long.

When the electric transceiver module connector 110 is pulled out from the slot 31 of the switching device 30, a user pulls the Y2 end of the electric transceiver module connector 110 in the Y2 direction while pushing the unlocking lever 190 (FIG. 7). By pushing the unlocking lever 190, the claw 190a (FIG. 7) elastically deforms a part of the slot 31 (FIG. 3) and the opening for locking (not shown) is unlocked from the protrusion for locking 179 (FIG. 7), then the unlocking is performed. As described above, unlocking operations and pulling out operations of the electric transceiver module connector 110 can be performed by one action.

Second Embodiment

Figure 14:
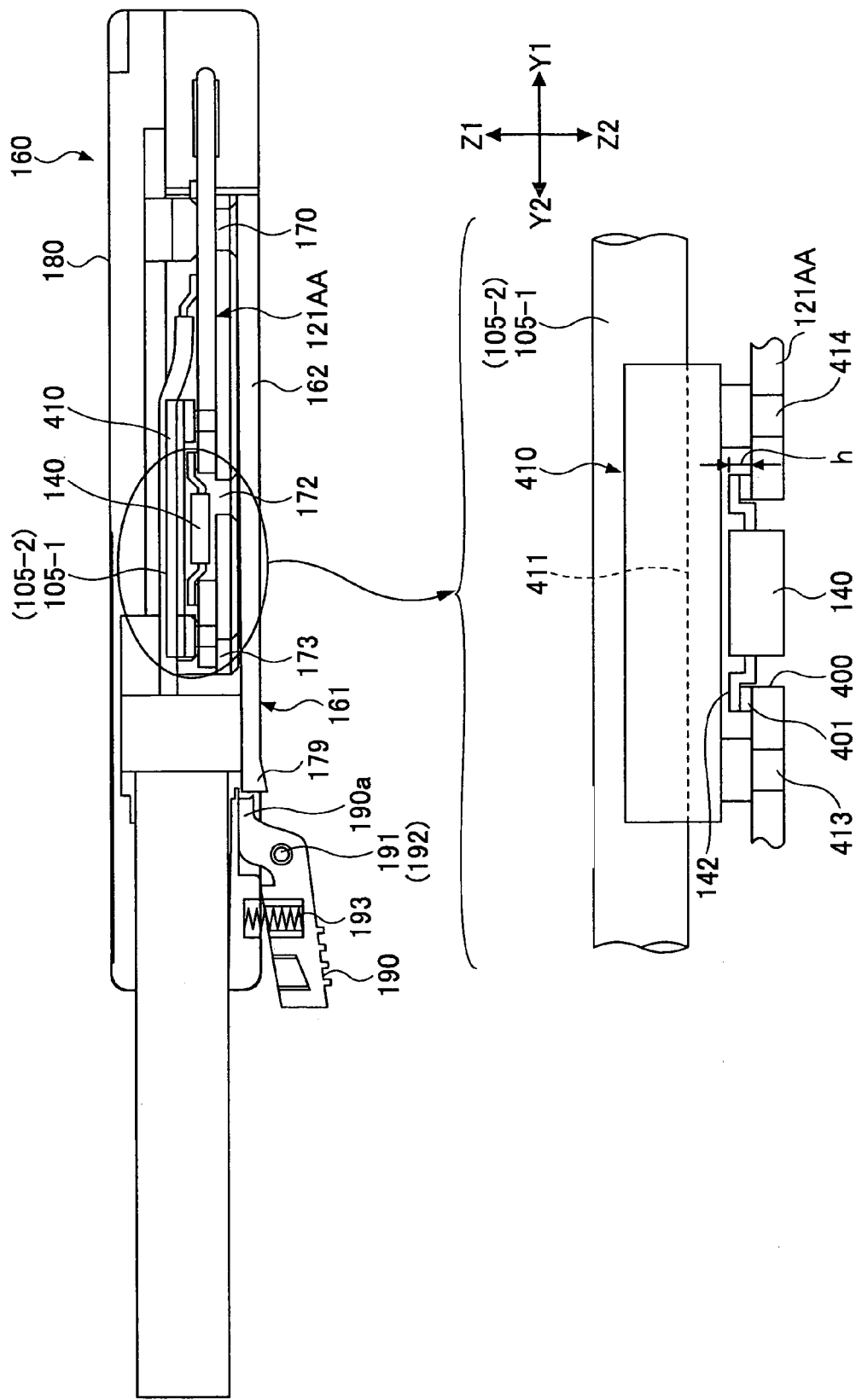
FIG. 14 is a side cut-away view of an electric transceiver module connector of a cable connector type transceiver module according to a second embodiment of the present invention.
Figure 15:
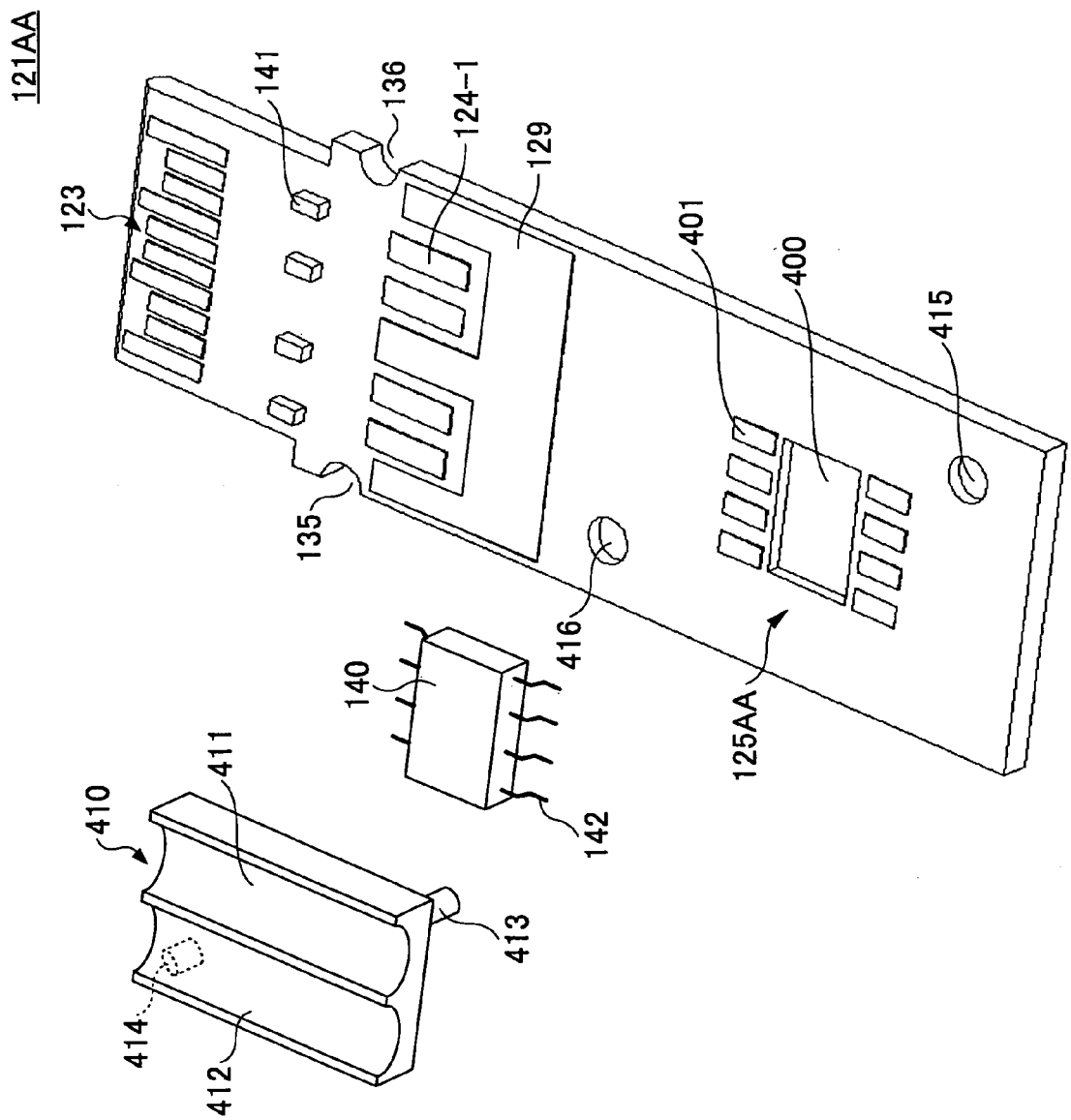
FIG. 15 is an exploded perspective view of a part where a control IC package is mounted in the electric transceiver module connector shown in FIG. 14.

FIG. 14 is a side cut-away view of an electric transceiver module connector of a cable connector type transceiver module 100A according to a second embodiment of the present invention. FIG. 15 is an exploded perspective view of a part where the control IC package 140 is mounted in the electric transceiver module connector shown in FIG. 14.

The cable connector type transceiver module 101A has the same structure as that of the cable connector type transceiver module 100 other than the mounting of the control IC package 140 and the disposition of the pairs of wires 105-1 and 105-2 over the control IC package 140.

As shown in FIG. 15, in a printed circuit board 121AA, an opening 400 whose size accommodates the size of the control IC package 140 is formed at a control IC package mounting section 125AA. Pads 401 are arrayed at both sides of the opening 400. As shown in an enlarged view in FIG. 14, the control IC package 140 is mounted on the printed circuit board 121AA so that the control IC package 140 is positioned in reverse. That is, the control IC package 140 is engaged in the opening 400 and the upper surfaces of leads 142 of the control IC package 140 are soldered to the pads 401. In this, the upper surfaces of leads 142 are determined in a normal posture. Therefore, the control IC package 140 is mounted on the printed circuit board 121AA where the distance "h" which is stuck out from the upper surface of the printed circuit board 121AA is short.

In FIG. 15, a pair of wires arranging member 410 provides concavity sections 411 and 412 in the upper surface and legs 413 and 414 on the lower surface. The pair of wires arranging member 410 is attached to the printed circuit board 121AA by inserting the legs 413 and 414 into holes 415 and 416 of the printed circuit board 121AA so as to cover the control IC package 140. The pairs of wires 105-1 and 105-2 are positioned by being fitted in the concavity sections 411 and 412.

When the cable connector type transceiver module 100A is assembled, the pairs of wires 105-1 and 105-2 can be easily arranged and the electric transceiver module connector can be easily formed with a limited height.

In this, the pair of wires arranging member 410 can be applied to the cable connector type transceiver module 100 of the first embodiment of the present invention. In this case, the legs 413 and 414 and the holes 415 and 416 must be modified so that the pair of wires arranging member 410 is positioned over the control IC package 140.

Third Embodiment

Figure 16:
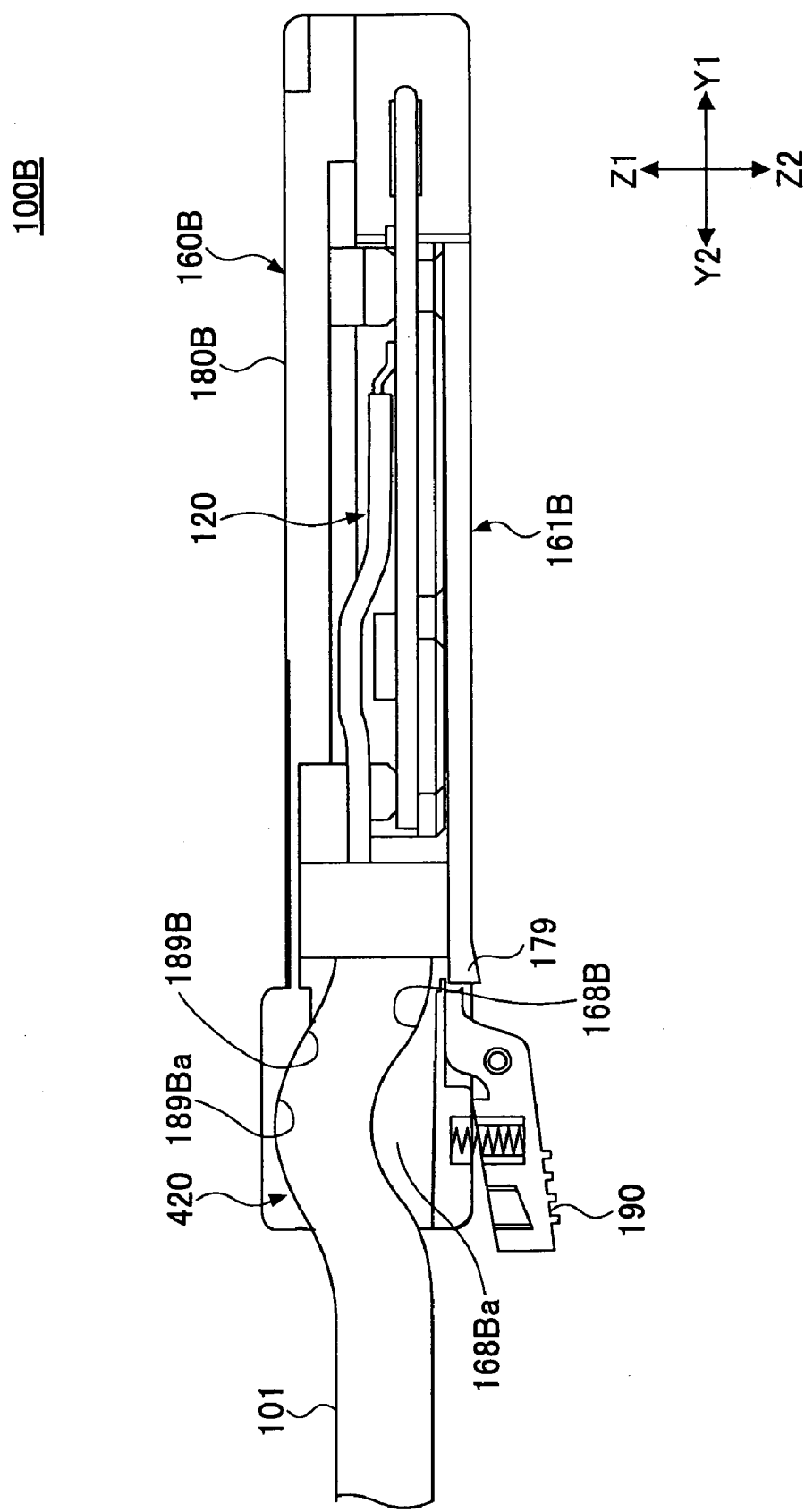
FIG. 16 is a side cut-away view of an electric transceiver module connector of a cable connector type transceiver module according to a third embodiment of the present invention.
Figure 17:
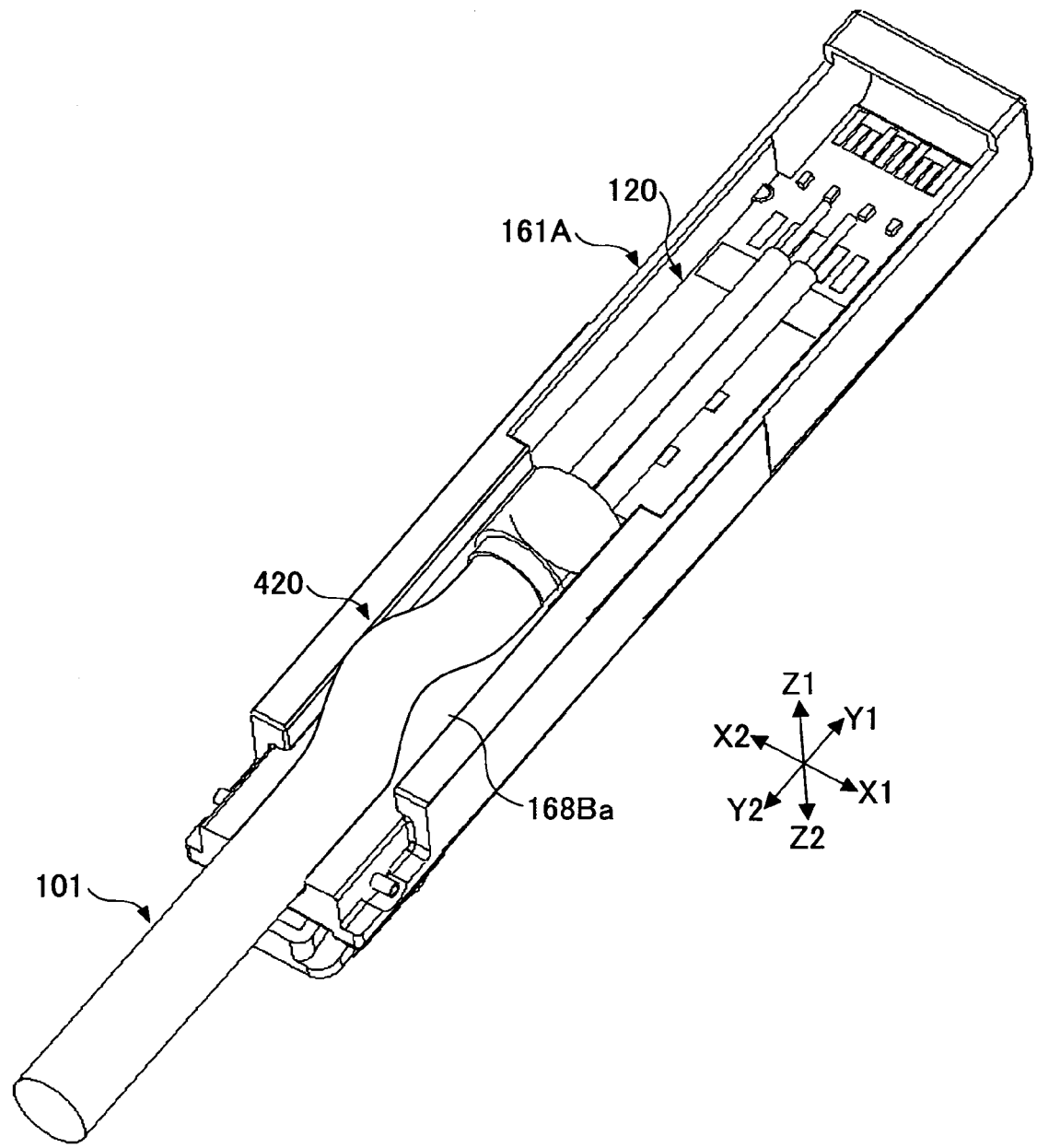
FIG. 17 is a perspective view of the inside of the electric transceiver module connector shown in FIG. 16.

FIG. 16 is a side cut-away view of an electric transceiver module connector of a cable connector type transceiver module 100B according to a third embodiment of the present invention. FIG. 17 is a perspective view of the inside of the electric transceiver module connector shown in FIG. 16. In the cable connector type transceiver module 100B, a structure which clamps the cable for balanced transmission 101 is different from that in the first embodiment.

A housing main body 161B of a housing 160B provides a curved concavity section 168B which is curved in the Z1 direction instead of the concavity section 168 which is a straight-line type in the first embodiment. The curved concavity section 168B provides an upward curved section 168Ba. An upper cover 180B provides a depressed section 189Ba which is curved in the Z1 direction at the position corresponding to the upward curved section 168Ba.

The cable for balanced transmission 101 is forced to conform to a curved section 420 composed of the upward curved section 168Ba and the depressed section 189Ba by being held by the curved concavity section 168B and being clamped by friction between the housing 160B and the curved section 420 so as not to be pulled out from the housing 160B.

Therefore, in the third embodiment, the cable for balanced transmission 101 can be surely secured to the housing 160B.

Further, the present invention is not limited to these embodiments, but various variations and modifications may be made without departing from the scope of the present invention.

The present application is based on Japanese Priority Patent Application No. 2005-348171 filed on Dec. 1, 2005, with the Japanese Patent Office, the entire contents of which are hereby incorporated by reference.

What is claimed is:

1. A cable connector type transceiver module, comprising:
   transceiver module connectors disposed one at each end of a cable for balanced transmission which cable provides pairs of wires in which a pair of insulation covered signal wires is bundled, and the transceiver module connector has a transceiver module main body assembled in a housing,
   the transceiver module main body includes
   a printed circuit board which provides a card edge connecting section at the tip, a plurality of pads for wire soldering near the card edge connecting section, and wiring patterns extending between the card edge connecting section and the pads for wire soldering; and
   a control IC package mounted on the printed circuit board; wherein
   the pairs of wires of the cable for balanced transmission are extended in the card edge connecting section direction over the control IC package, and
   signal wires which the tips of the insulation covered signal wires are uncovered are soldered to the pads for wire soldering.

2. The cable connector type transceiver module as claimed in claim 1, wherein:
   the pads for wire soldering are arrayed parallel to the card edge connecting section, and
   the tips of the signal wires soldered to the pads for wire-soldering are arrayed parallel to the card edge connecting section.

3. The cable connector type transceiver module as claimed in claim 1, wherein:
   the printed circuit board provides the wiring patterns from the card edge connecting section to the pads for wire soldering on the surface of an insulation layer formed on a ground pattern inside the printed circuit board, and
   the insulation layer has a predetermined thickness for impedance matching.

4. The cable connector type transceiver module as claimed in claim 1, wherein:
   AC coupling capacitors are mounted on the wiring patterns in the middle from the card edge connecting section to the pads for wire soldering on the printed circuit board.

5. The cable connector type transceiver module as claimed in claim 1, wherein:
   the printed circuit board provides the pads for wire soldering and the wiring patterns on the upper surface and other wiring patterns from the card edge connecting section to the control IC package on the lower surface.

6. The cable connector type transceiver module as claimed in claim 1, wherein:
the printed circuit board provides an opening where the control IC package is to be mounted and the control IC package is mounted by being engaged in the opening.

7. The cable connector type transceiver module as claimed in claim 1, wherein:
a pair of wires arranging member is attached to the printed circuit board so as to cover the mounted control IC package, and
the pairs of wires are extended to the pads for wire soldering over the control IC package by being arranged by the pair of wires arranging member.

8. The cable connector type transceiver module as claimed in claim 1, wherein:
the housing includes a housing main body and an upper cover,
the housing main body includes a bottom plate section, a side plate section at each side, a bridge section which spans between the side plate sections at one end, and a housing main body cable clamping section at the other end,
the upper cover includes an inserting section at one end and an upper cover cable clamping section at the other end, and
the inserting section is engaged under the bridge section, the cable for balanced transmission is clamped by being pushed by the upper cover cable clamping section and the housing main body cable clamping section, and the upper cover cable clamping section is secured to the housing main body cable clamping section by pressing pins into holes formed in the upper cover cable clamping section and the housing main body cable clamping section from the sides.

9. The cable connector type transceiver module as claimed in claim 8, wherein:
the housing main body cable clamping section includes an upward curved section and the upper cover cable clamping section includes a depressed section at the position corresponding to the upward curved section, and
the cable for balanced transmission is forced to conform to the upward curved section and the depressed section and is clamped so as not to be pulled out from the housing by friction between the housing and a curved section which is composed of the upward curved section and the depressed section.

* * * * *

UNITED STATES PATENT AND TRADEMARK OFFICE
CERTIFICATE OF CORRECTION

| | | |
|---|---|---|
| PATENT NO. | : 7,297,028 B2 | Page 1 of 1 |
| APPLICATION NO. | : 11/489482 | |
| DATED | : November 20, 2007 | |
| INVENTOR(S) | : Osamu Daikuhara et al. | |

It is certified that error appears in the above-identified patent and that said Letters Patent is hereby corrected as shown below:

Column 10, Line 45, change "wire-soldering" to --wire soldering--.

Signed and Sealed this

Sixth Day of May, 2008

JON W. DUDAS
*Director of the United States Patent and Trademark Office*